US006599369B2

(12) United States Patent
Hu et al.

(10) Patent No.: US 6,599,369 B2
(45) Date of Patent: Jul. 29, 2003

(54) METHOD OF TREATING CONTAMINATED HEPA FILTER MEDIA IN PULP PROCESS

(75) Inventors: Jian S. Hu, Idaho Falls, ID (US); Mark D. Argyle, Idaho Falls, ID (US); Ricky L. Demmer, Idaho Falls, ID (US); Emilio P. Mondok, Idaho Falls, ID (US)

(73) Assignee: Bachtel BWXT Idaho, LLC, Idaho Falls, ID (US)

( * ) Notice: Subject to any disclaimer, the term of this patent is extended or adjusted under 35 U.S.C. 154(b) by 189 days.

(21) Appl. No.: 09/791,952

(22) Filed: Feb. 23, 2001

(65) Prior Publication Data

US 2003/0041874 A1 Mar. 6, 2003

(51) Int. Cl.$^7$ ............................. B08B 3/12; B08B 6/00; B08B 7/00; B08B 7/02
(52) U.S. Cl. ............................ 134/1; 134/10; 134/13; 134/33; 252/626; 252/633
(58) Field of Search .................. 134/1, 10, 13, 134/33; 252/626, 633; 219/121.59; 436/174; 588/6, 19, 20

(56) References Cited

U.S. PATENT DOCUMENTS

| 5,288,434 A | 2/1994 | Brewer et al. ............. 252/626 |
| 5,584,938 A | * 12/1996 | Douglas ..................... 134/1.3 |

FOREIGN PATENT DOCUMENTS

| JP | 6075095 | 3/1994 | ............. G21F/9/30 |

OTHER PUBLICATIONS

Brewer, K.N., et al "Hydrofluoric Acid Dissolution of Spent Radioactive and Hazardous HEPA Filters," WINCO–11814, Apr. 20, 2000.

Chakravartty, A.C., "HEPA Filter Leaching Concept Validation Trials at the Idaho Chemical Processing Plant," INEL–95/0182, Apr. 1995.

Chakavartty, A., et al, "Leaching of Spent HEPA Filters for Cost Effective Disposal," *Proceedings of the 6$^{th}$ Annual International Conference*, American Nuclear Society, Inc., Las Vegas, NV, Apr. 30–May 5, 1995, pp. 677–678.

Clark, D.E., "Use of Sulfuric–Nitric Acid for the Recovery of Plutonium from HEPA Filters," HEDL–TME 78–67, Sep. 1978.

Donovan, R.I., et al., et al., "HEPA Filter Leachng Demonstration Results," Westinghouse Idaho Nuclear Company, Inc., Jul. 31, 1984.

Hu,J.S., et al, "Development of Pulp Process Treating Contaminated HEPA Filters (Part 1)" *Waste Management Conference*, Feb. 27, 2000, Tucson AZ.

(List continued on next page.)

*Primary Examiner*—Randy Gulakowski
*Assistant Examiner*—Gentle E. Winter
(74) *Attorney, Agent, or Firm*—Clayton Howarth & Cannon

(57) ABSTRACT

A method for reducing contamination of HEPA filters with radioactive and/or hazardous materials is described. The method includes pre-processing of the filter for removing loose particles. Next, the filter medium is removed from the housing, and the housing is decontaminated. Finally, the filter medium is processed as pulp for removing contaminated particles by physical and/or chemical methods, including gravity, flotation, and dissolution of the particles. The decontaminated filter medium is then disposed of as non-RCRA waste; the particles are collected, stabilized, and disposed of according to well known methods of handling such materials; and the liquid medium in which the pulp was processed is recycled.

20 Claims, 8 Drawing Sheets

OTHER PUBLICATIONS

Hu, J.S., et al, "Development of Pulp Process Treating Contaminated HEPA Filters (Part I1)" *Waste Management Conference*, Feb. 26, 2001, Tucson AZ.

Izumida, T., et al, "Fundamental Study on Recovery Uranium Oxide from HEPA Filters," pp. 283–287.

Koonst, J.W., et al, "Decontamination of HEPA Filters," *Proceesings of the 15th Nuclear Air Cleaning Conference*, Boston MA Aug. 1978, vol. 15 No. 2 pp. 1191–1225.

McCray, C.W., et al, "HEPA Filter Leach System Technical Basis Report," WINCO–1096, May 1992.

Murphy, J.A., et al, "Hydrofluoric Acid Dissolution of Spent Radioacrive and Hazardous HEPA Filters," WINCO–1099, Apr. 1992.

Oma, K. H., et al, "Waste Isolation in the U.S. Technical Programs and Public Education," *Proceedings of the Symposium on Waste Management*, Tucson AZ Mar. 1–5 1987.

Roge, P.E., "B Plant Retired HEPA Filters Engineering Study," (Project W–059), WHC–SD–W059–ES–002, Oct. 5, 1994.

Scheitlin, F.M., et al, "Recovery of Plutonium from HEPA Filters by Ce(IV)—Promoted Dissolution of $PuO_2$ and Recycle of the Cerium Promoter," ORNL/TM–6802, May 1980.

Waite, T.H., "Design and Installation of a Radioactive Filter Leaching System at the Idaho Chemical Processing Plant," *Proceedings, 36th Conference on Remote Systems Technology*, 1988 vol. 2, pp. 81–86.

Willis, W.D., "Feasibility Study for Modifications to the NWCF Filter Leaching System," EGG–ME–10191, Mar. 1991.

Willis, W.D., "Feasibilty Study for an Additional HEPA Filter Leaching System in NWCF," EGG–ME–10522, Nov. 1992.

Ziegler, D.L., et al, "Disposal of HEPA Filters by Fluidized Bed Incineration," RFP–2768, Aug. 1978.

Mosanto Research Corp., "Decontamination of HEPA Filters," Quarterly Report, Oct., Nov., Dec., 1976, MLM–MU–77–62–004, 1976.

"WINCO Position on HEPA Filter Leaching Technology," Dec. 18, 1991.

* cited by examiner

METHOD OF TREATING CONTAMINATED HEPA FILTER MEDIA IN PULP PROCESS

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

RELATED APPLICATION

BACKGROUND OF THE INVENTION

This invention relates to treating radioactive and hazardous wastes. More particularly, this invention relates to a method for treating air filters contaminated with radioactive and/or hazardous materials such that these radioactive and hazardous materials are efficiently and inexpensively removed.

High Efficiency Particulate Air (HEPA) filters are replaceable extended-media dry-type filters in a rigid frame having a maximum particle collective efficiency of 99.97% for a 0.3 $\mu$m particle and a maximum clean filter pressure drop of 2.54 cm water gauge when tested at rated air flow capacity. HEPA filter media are typically a mixture of fire retardant glass fibers, special acid resistant materials (KEVLAR/NOMAX), and a chemical binder, however, stainless steel HEPA filters are also in use. Corrugated, overlapped filter media are sealed to the edges of the filter housing with high temperature resistant silicone. The typical filter housing is made of 14 gauge 300 series austenitic stainless steel. Most filters have a plastic mesh on the top and a stainless steel screen on the bottom to ensure that the filter media remain intact.

HEPA filters are used to clean air for operations involving a variety of hazardous materials from asbestos to radionuclides. HEPA filters are widely used, and their use will likely increase in the future, both in waste clean-up and in applications such as indoor air quality and disposal of old fluorescent lamps. HEPA filters are used in medical, military, electronic, and industrial applications where clean or superclean air is essential to the work.

An example of how HEPA filters are used comes from the New Waste Calciner Facility (NWCF) at the Idaho Nuclear Technology and Engineering Center. This facility was originally designed to process spent nuclear fuel by dissolving the fuel and extracting the reusable uranium. The waste is calcined to form a dry powder and put into concrete storage bins for indefinite storage. NWCF operations involve the handling of fission products, transuranic (TRU) materials (i.e., alpha-emitting radionuclides with atomic numbers greater than 92 and half-lives greater than 20 years), and hazardous materials. HEPA filters are used in the off-gas streams to prevent these materials from entering and contaminating the environment. As a result, many HEPA filters contaminated with radioactive (5–120 R/hr ($\beta/\gamma$)), transuranic (TRU content >600 nCi/g has been observed), and toxic metal constituents (6–12 mg Cd/g, 2–4 mg Cr/g, and 3–6 mg Hg/g) have been generated. R. I. Donovan et al., NWCF HEPA Filter Leaching Demonstration Results (1984); C. W. McCray & K. N. Brewer, HEPA Filter Leach System Technical Basis Report, WINCO-1096 (1992); A. C. Chakravartty, HEPA Filter Leaching Concept Validation Trials at the Idaho Chemical Processing Plant, INEL-95/0182 (1995). Currently there is no disposal facility that will accept such contaminated HEPA filters. Hence, a HEPA filter leach system was designed to lower radiation and contamination levels and reduce cadmium, chromium, and mercury concentrations on spent HEPA filter media to below disposal limits set by the Resource Conservation and Recovery Act (RCRA). The treated HEPA filters are then disposed of as low-level radioactive waste.

The leach system currently in use for treating the NWCF HEPA filters has been approved by the EPA and the State of Idaho. According to the approved procedure, leaching of each filter requires three 60-gallon (227.1 liters) leach cycles using 1 to 3 M nitric acid, followed by two 60-gallon water rinses. This procedure generates 300 gallons (1135.6 liters) of dilute nitric acid waste per filter. Nitric acid is used in the leaching process because of its ability to dissolve calcine, remove radioisotopes, and extract RCRA metals from the filters. Validation tests of this leaching system resulted in reduction of radioactivity from 5–120 R/r ($\beta/\gamma$) to 30–90 mR/hr ($\beta/\gamma$), while TRU levels dropped from greater than 600 nCi/g to 0.4–3.6 nCi/g. Cadmium, chromium, and mercury concentrations on spent HEPA filter media were successfully reduced to below disposal limits set by the RCRA. Since the validation tests, 139 HEPA filters classified as TRU mixed waste have been processed and disposed of as low-level radioactive waste.

The existing HEPA filter leaching system performed well in the past, however, as the concentration of mercury in the calciner off-gas system has increased in recent years, more mercury has been deposited on HEPA filters. The leaching system has difficulty removing the higher concentrations of mercury from these HEPA filters. The filter media and the trapped calcine particles are confined in a heavy filter housing that contributes to poor mixing zones around the edges of the filter housing. Other inefficiencies in the existing filter leaching system that result in poor solubility and mass transfer of the contaminants from the HEPA filter media include low media permeability, channeling of the liquid through cracks and tears in the filter media, and liquid retention between leach and rinse cycles.

In addition to the leaching method described above, other methods have been reported in the literature for treating HEPA filters, including compaction, supercompaction, incineration, vitrification or melting, dissolution of the filter medium, and macroencapsulation in cement.

Compaction and supercompaction are relatively inexpensive methods for reducing waste volume, but they do not remove any contaminants from the filters, stabilize radionuclides, or qualify as valid RCRA treatments for characteristic metals. Controlling and containing the spread of contamination for these processes are also a concern.

Incineration is an excellent treatment process in terms of volume reduction for HEPA filters with wood housings. D. L. Zeigler & A. J. Johnson, Disposal of HEPA Filters by Fluidized Bed Incineration, RFP-2768 (1978); D. L. Zeigler & A. J. Johnson, Disposal of HEPA Filters by Fluidized Bed Incineration, Proc. 15th Nucl. Air Cleaning Conf., Boston, Mass. 5 (1978). This process meets RCRA treatment standards for waste that contains both listed and characteristic RCRA constituents assuming the final grouted ash waste form can pass toxicity characterization leaching procedure (TCLP). The final waste form, however, would still be considered an RCRA listed waste if the original waste had any RCRA listed waste in it. Incineration processes are among the most expensive treatment options and have problems associated with treating waste containing volatile metals. Where the housings for HEPA filters are stainless steel, only the polymer coating on the fiberglass media and seal material burn. Therefore, incineration is not practical or useful for volume reduction. Moreover, the off-gas requires expensive treatment, because many of the HEPA filters contain volatile mercury.

Vitrification or melting is the best process available in terms of overall volume reduction. This process is expected to meet RCRA treatment standards for waste that contains characteristic RCRA constituents, since vitrified waste forms typically perform well in passing TCLP. Vitrification or melting typically has problems associated with treating waste containing volatile metals. Hence, scrubbing of the off-gas is required because many of the HEPA filters contain volatile mercury compounds. This process does not meet RCRA requirements for treating listed waste. Moreover, melting is both an expensive and energy-intensive process.

Dissolution is a process wherein the filter media are removed from the filter housings and dissolved in an appropriate solvent, such as hydrofluoric acid (HF). D. E. Clark, Use of Sulfuric-Nitric Acid for the Recovery of Plutonium from HEPA Filters, HEDL-TME-78–67 (1978); F. M. Scheitlin & W. D. Bond, Recovery of Plutonium from HEPA Filters by Ce (IV): Promoted Dissolution of $PUO_2$ and Recycle of the Cerium Promoter, ORNL/TM-6802 (1980); R. E. Lueze et al., Recovery of Plutonium from HEPA Filters by Ce(IV)-Promoted Dissolution of PuO2 and Recycle of the Cerium Promoter, Proc. Int'l Conf. Nucl. Waste Transmutation 33 (1980); K. N. Brewer & J. A. Murphy, HEPA Filter Dissolution Process, U.S. Pat. No. 5,288,434 (1994); K. N. Brewer & J. A. Murphy, Hydrofluoric Acid Dissolution of Spent Radioactive and Hazardous HEPA Filters, WINCO-11814 (1992); K. N. Brewer & J. A. Murphy, Hydrofluoric Acid Dissolution of Spent Radioactive and Hazardous HEPA Filters, Proc. Spectrum '92 Nucl. And Hazardous Waste Management Int'l Topical Meeting 12 (1992). The process not only dissolves the fiberglass filter media, but also destroys any organic compounds present. Dissolution of filter media is a relatively inexpensive process; costs are comparable to the filter leaching system described above. However, the process produces a secondary corrosive liquid waste stream that requires further treatment. This secondary waste is difficult to treat due to high dissolved solid and salt content.

Macroencapsulation of the filters in cement is a relatively inexpensive process that stabilizes the characteristic metal and radionuclide contamination by encapsulating the whole HEPA filter in cement. T. Koya & F. Toshimasa, Method for Treating HEPA Filter, JP6075095 (1994). This treatment meets RCRA standards for treating characteristic metals, assuming the final waste form can pass TCLP. However, this treatment is not considered adequate if the waste contains any RCRA listed waste. Further, the process results in a significant volume increase. Also, disposal options for the final waste form are limited. It is likely that some of the waste would fall in the 10 to 100 nCi/g range for TRU waste, for which there is no permitted facility that would accept the final waste form.

In view of the foregoing, it will be appreciated that providing a method for treating HEPA filters contaminated with radioactive and/or hazardous materials, wherein the method is effective and inexpensive, minimizes/eliminate the use of strong acids, results in a reduced volume of treated material, and results in a minimal amount of secondary waste, would be a significant advancement in the art.

BRIEF SUMMARY OF THE INVENTION

It is a feature of an illustrative embodiment of the present invention to provide a method for treating contaminated HEPA filter media that is relatively inexpensive, improves circulation of fluid to contaminated filter media for improved contamination removal, and minimizes/eliminates strong acids.

It is also a feature of an illustrative embodiment of the invention to provide a method for treating contaminated HEPA filter media that includes a pretreatment step for separating loose contaminants, thereby requiring less contamination to be removed in subsequent steps.

It is another feature of an illustrative embodiment of the invention to provide a method for simultaneously processing multiple filters, thereby resulting in processing of filters at a greater rate.

It is still another feature of an illustrative embodiment of the invention to provide a method for treating contaminated HEPA filters that permits compaction of filter housings and treated filter media, thereby resulting in a reduced volume of treated material.

It is yet another feature of an illustrative embodiment of the invention to provide a method for treating HEPA filters wherein the processing fluid is recycled, resulting in a minimal amount of secondary waste.

These and other features can be addressed by providing a method for reducing contamination with radioactive and hazardous materials of a HEPA filter comprising a filter medium and housing in which the filter medium is contained comprising:

removing loose particles and solids from the HEPA filter;

removing the filter medium from the housing;

decontaminating the housing; and after removing the filter medium from the housing, processing the filter medium in a liquid medium for removing trapped particles;

disposing of the filter medium from which the particles have been removed as non-RCRA waste;

collecting the particles from the liquid medium, stabilizing the collected particles, and disposing of the stabilized particles; and recycling the liquid medium after the particles are collected therefrom.

DETAILED DESCRIPTION OF THE INVENTION

Figure 1:
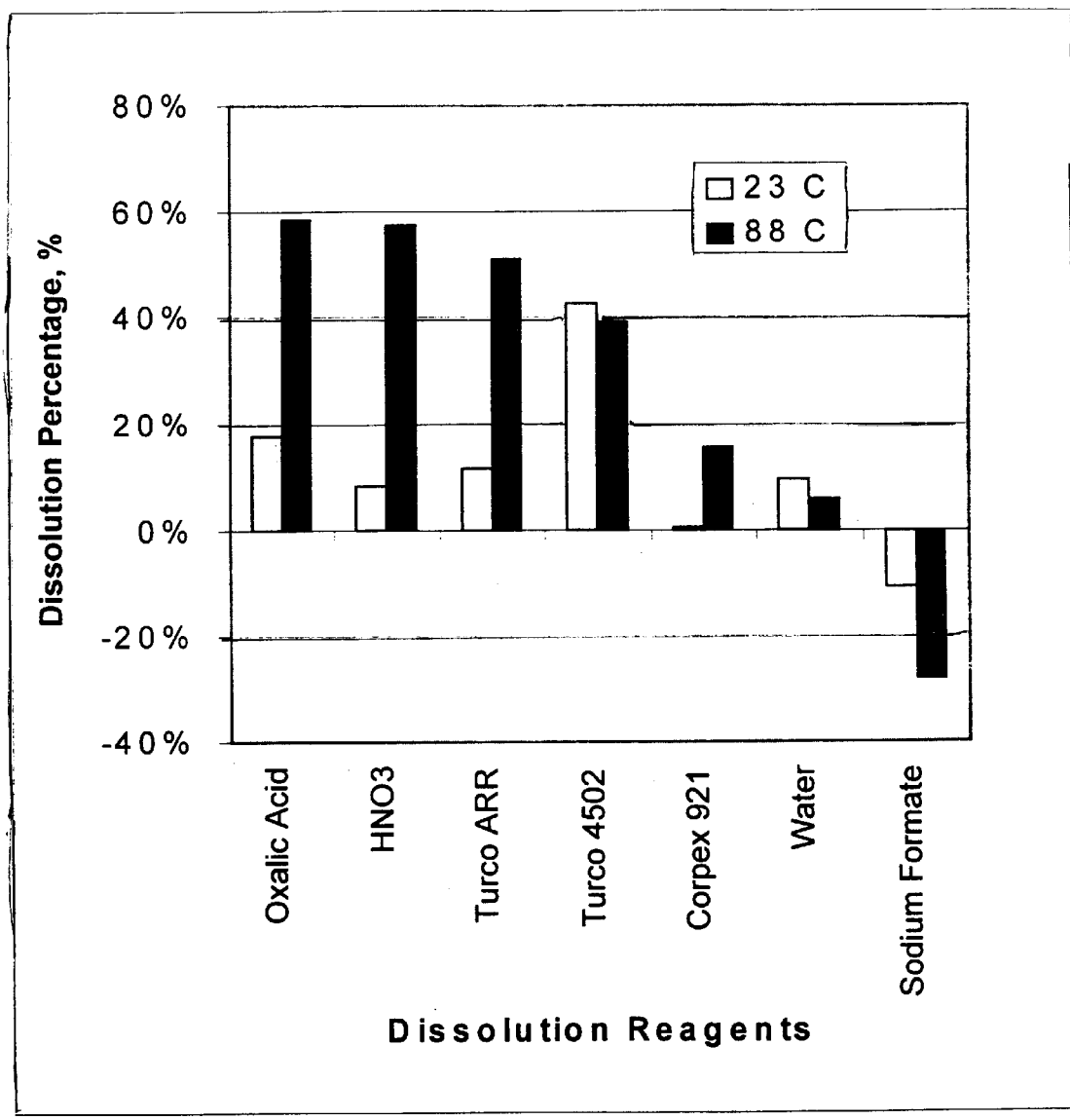
FIG. 1 shows a histogram of the solubility of aluminum calcine in various reagents at 23° C. (□) and 88° C. (■)

Before the present method of treating contaminated HEPA filter media is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

The present invention is a method of treating contaminated HEPA filters that maximizes the use of physical separation techniques. The HEPA filter medium is removed from the filter housing and treated in a pulp form to take advantage of improved and additional physical properties that cannot be used when the medium is still in the HEPA filter housing. The present invention comprises (1) pre-processing for removing loose particles and solids, (2) filter medium removal from the housing, (3) decontamination of the HEPA filter housing, and (4) pulp processing of filter media to remove trapped particles. Each of these steps will be described in more detail below.

Pre-Processing.

Pre-processing relates to procedures for removing loose particles and solids prior to removing the HEPA filter medium from the housing. Pre-processing can be accomplished by (a) electrostatically charging the filter housing and filter medium to repel loose particles and solids, which fall into a collection vessel (the collection vessel has an opposite charge or a vacuum pulled on it to retain discharged medium, particles, and the like, and/or (b) dipping the HEPA filter in water or another liquid medium with the loose medium side down (a vibrator or ultrasonic source can be used to shake particles off of the filter into the water). The water or other liquid medium is decanted from the bottom of the collection vessel to a hydro-cyclone for separation of particles and liquid.

Removal of Filter from Housing.

Following pre-processing, removal of the filter medium from the housing is accomplished by cutting, chipping, scraping, shredding, or other appropriate method. The filter medium should first be wetted with water or other appropriate wetting agent to control spread of contamination. The shredded or broken filter medium is then placed in the process vessel used for the pulp processing, described below.

Decontamination of HEPA Filter Housings.

The HEPA filter housings are decontaminated using conventional decontamination techniques, such as washing, wiping, scraping, and the like. Once the filter housings have been de-contaminated, they can be compacted for volume reduction prior to disposal, according to well known methods.

Pulp Processing.

Pulp processing uses physical and/or chemical techniques, such as gravity separation or flotation, to separate particles and trapped solids from the pulp filter medium. The medium is agitated and mixed in the processing solution to liberate the particles and trapped solids. Agitation can be accomplished by fluid jetting, mixing, or stream or air sparging. After the particles have been liberated from the filter medium the agitation is stopped and the medium is allowed to separate by gravity and/or flotation techniques known in the art. The filter medium floating on the surface is skimmed off, de-watered, and dried for disposal as a non-RCRA waste. The material at the bottom of the vessel is drawn out the bottom of the vessel and separated by use of hydro-cyclones and/or filtration. The solids are then stabilized by methods well known in the art and sent for disposal. The liquid is recycled for further use in pulp processing of additional HEPA filter media.

Dissolution (leaching) of the particles and trapped solids into an appropriate solvent is only used in cases where appropriate decontamination factors cannot be achieved using the physical methods described above. However, by carrying out the dissolution in pulp form, the problems of channeling through cracks in the medium and dead zones observed in leaching of the medium while still in the filter housings are eliminated. This greatly increases the mass transfer rates and improves dissolution. Moreover, dissolution can be enhanced still further using an ultrasonic source.

Benefits of the present invention include that water washing is an acceptable RCRA debris treatment. The pre-treatment step allows for some pre-separation of loosely held contaminants, resulting in less contamination to be removed in subsequent treatment steps. Removing the contaminated filter medium and treating it separately from the filter housing allows for several HEPA filters to be processed at the same time. The filter housing can be cleaned using standard decontamination techniques and then compacted for volume reduction. The treated filter media can also be compacted into a waste container. The instant pulp processing method has benefits similar to leaching that is relatively inexpensive and can remove some radionuclides and characteristic metals without using strong acidic leach solutions. The present method has additional benefits not enjoyed by leaching technology, such as improving circulation of the fluid to the contaminated filter media for improved contamination removal without problems associated with poor mixing due to channeling and dead zones. Since the processing fluid is recycled, the process produces minimal secondary waste, which is a big advantage over the leaching technology.

The present pulp processing technology can be applied to treatment of HEPA filters that have been contaminated with toxic metals and/or radionuclides. These include HEPA filters from Department of Energy facilities, chemical processing facilities, plating shops, incineration facilities, and the like. A large portion of HEPA filters in use outside of Department of Energy facilities are contained in wooden housings. Currently, these HEPA filters and wooden housings are incinerated. The new Maximum Achievable Control Technology (MACT) rules require emissions of characteristic metals from incineration processes to be reduced to levels as low as possible. These new rules make pulp processing technology attractive for replacing incineration as the disposal method for HEPA filters contaminated with characteristic metals. The primary characteristic metals that are of concern are mercury (highly volatile), lead and cadmium (semi-volatile), and chromium and arsenic (low volatility). This assumes that chromium is in the more common trivalent state $Cr_2O_3$ instead of the hexavalent state $CrO_3$, which is more volatile. The MACT requirements are more stringent with respect to the low volatility components, since they are easier to remove than the more volatile components. Hence, all of these constituents could pose a concern during incineration. The presently described pulp processing technology would alleviate these air emission concerns. The wooden filter housings could still be incinerated, however, after the filter media have been removed.

EXAMPLE 1

To verify the validity of the concept of pulp processing for HEPA filter treatment, the following chemical and physical characteristics were determined: (1) the solubility of calcine particles in potential dissolution reagents, and (2) the size distribution of the calcine particles trapped in the filter media.

Non-radioactive calcine fines from a pilot calciner were collected and used in this example under the assumption that calcine particles trapped in the HEPA filters are mostly fine particles. Two calcine samples used in this example were aluminum calcine (RSH-1, Fines, Lot #1) and zirconium calcine (Run 74, Fines, Lot #CKJ2).

Dissolution reagents tested were nitric acid, oxalic acid, sodium formate, and three commercial decontamination reagents, CORPEX 921, TURCO 4502, and TURCO ARR. The acids and salts were technical grade. The specifications of the commercial decontamination reagents were as follows: CORPEX 921—5.8 wt % of ethylenediaminetetraacetyl hydrazide ($C_{10}N_{10}O_4H_{94}$) in water, pH==7.0, melting point <-1° C., solubility in water=100%, and specific gravity=1.05±0.05; TURCO 4502—77 wt % potassium hydroxide, 3 wt % potassium chromate, and 20 wt % potassium permanganate, pH (3.1% in water)=12.5–13.5, and specific gravity=0.96; TURCO ARR (Alkaline Rust Remover)—70 wt % sodium hydroxide, <5 wt % kerosene, 15 wt % triethanolamine, and <5 wt % diethanolamine, boiling point=117° C., pH (3.1% in water)=12–14, and specific gravity=1.3.

Experiments were conducted at room temperature (23° C.) and then repeated at elevated temperature (88° C.) for comparison purposes. In both cases, 3.6 g of aluminum or zirconium calcine was placed in 100 ml of dissolution agent and sparged with air at 450 ml/in for 60 minutes. The standard dissolution agent concentration used in the tests was 2M except for oxalic acid and TURCO 4502, which were limited by their saturation concentration of 1 M. Since CORPEX 921 only contains about 0.015 M of its active component, it was used without dilution.

No water washing was used, since a water-wash would further decrease the solid to liquid ratio, which was already quite low (3.6:100), and a water-wash of the filter cake would introduce some deviation in measuring the dissolution power of the reagents since calcine dissolves in water to a limited extent.

A four-neck reaction flask (250 ml) was set up with an air sparging tube, electronic thermometer, and condenser each in a different neck of the flask, and the flask was placed on a heating mantle. One hundred ml of test solution was placed in the flask through the fourth neck, the sparging air was set at a flow rate of 450 ml/min, and the heating mantle was turned on. When the temperature in the flask reached a selected temperature, 3.60 g of calcine (Wo) was added to the flask through the fourth neck and a timer was started. Next, the top part of a disposable filtering unit (250 ml) with a 0.45 μm pore size filter in place was weighed (Wi), and the filter unit was then reassembled. At 60 minutes after adding the calcine, the flow of air was stopped and the contents of the reaction flask were poured through the filter unit. The pH of the filtrate was recorded. The filter was drained by gravity until dripping stopped, and then the top part of the filter unit was place in an oven for drying at 60° C. overnight. After drying was complete, the top part of the filter unit was cooled to room temperature and weighed (Wf). The weight percent of the calcine that dissolved was calculated according to the following formula:

wt % dissolved=$100[(Wo+Wi)-Wf]/Wo$

The dissolution percentages of aluminum calcine are shown in Table 1 and FIG. 1. Generally, more calcine dissolved at elevated temperature than at room temperature. The relative dissolving power of the reagents at elevated temperature was, from greatest to least, oxalic acid, nitric acid, TURCO ARR, TURCO 4502, CORPEX 921, water, and sodium formate. The dissolving power of oxalic acid was equivalent or superior to that of nitric acid at elevated temperature. The dissolution percentages of aluminum calcine in sodium formate showed negative values, which was probably due to precipitation. In water, aluminum calcine had a low solubility, 5.8% at elevated temperature.

TABLE 1

| Reagent | Solubilities of Aluminum Calcine (wt %) | |
|---|---|---|
| | 23° C. | 88° C. |
| Oxalic acid | 17.63 | 58.46 |
| Nitric acid | 8.39 | 57.56 |
| TURCO ARR | 11.62 | 50.97 |
| TURCO 4502 | 42.52 | 39.28 |
| CORPEX 921 | 0.55 | 15.37 |
| Water | 9.56 | 5.82 |
| Sodium Formate | −10.82 | −28.12 |

Figure 2:
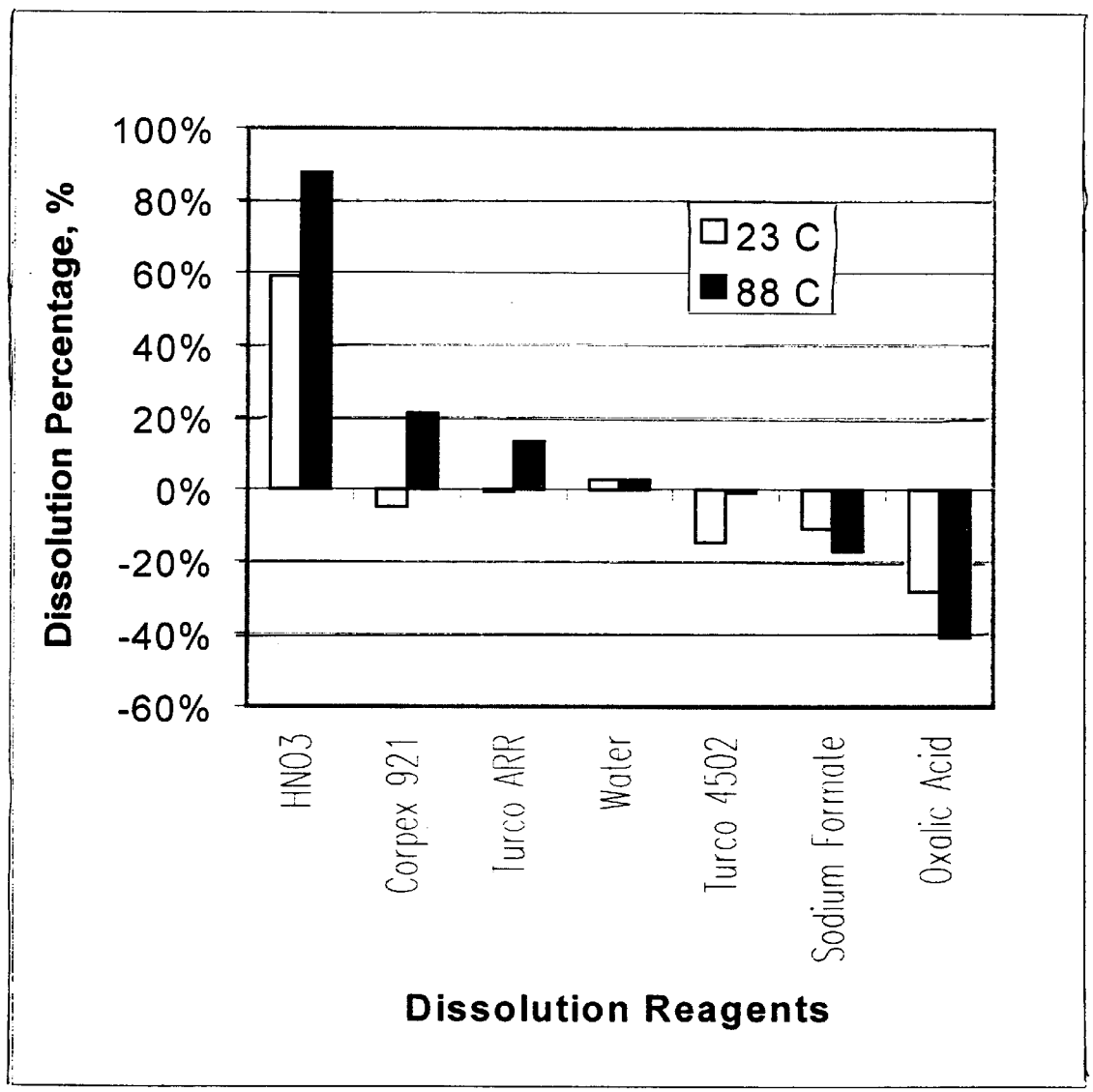
FIG. 2 shows a histogram of the solubility of zirconium calcine in various reagents at 23° C. (□) and 88° C. (■).

The dissolution percentages of zirconium calcine in the six reagents are shown in Table 2 and FIG. 2. Similar to the aluminum calcine dissolution results, the zirconium calcine was more soluble at elevated temperature than at room temperature. The dissolving power of these reagents at elevated temperature was, from greatest to least, nitric acid, CORPEX 921, TURCO ARR, Water, TURCO 4502, sodium formate, and oxalic acid. Nitric acid was much stronger than the other reagents in dissolving zirconium calcine. The dissolution percentages of zirconium calcine not only showed negative values in sodium formate, but also in TURCO 4502 and oxalic acid. This phenomenon was probably due to precipitation. In water, zirconium calcines had a very low solubility, 2.7% at the elevated temperature. Temperature seemed to have no significant effect on the solubility of zirconium calcine in water.

TABLE 2

| Reagent | Solubilities of zirconium calcine (wt %) | |
|---|---|---|
| | 23° C. | 88° C. |
| Nitric acid | 58.97 | 87.60 |
| CORPEX 921 | −4.99 | 21.21 |
| TURCO ARR | −0.69 | 13.30 |
| Water | 2.90 | 2.70 |
| TURCO 4502 | −14.68 | −0.97 |
| Sodium formate | −10.82 | −17.22 |
| Oxalic acid | −28.44 | −40.98 |

EXAMPLE 2

Figure 3:
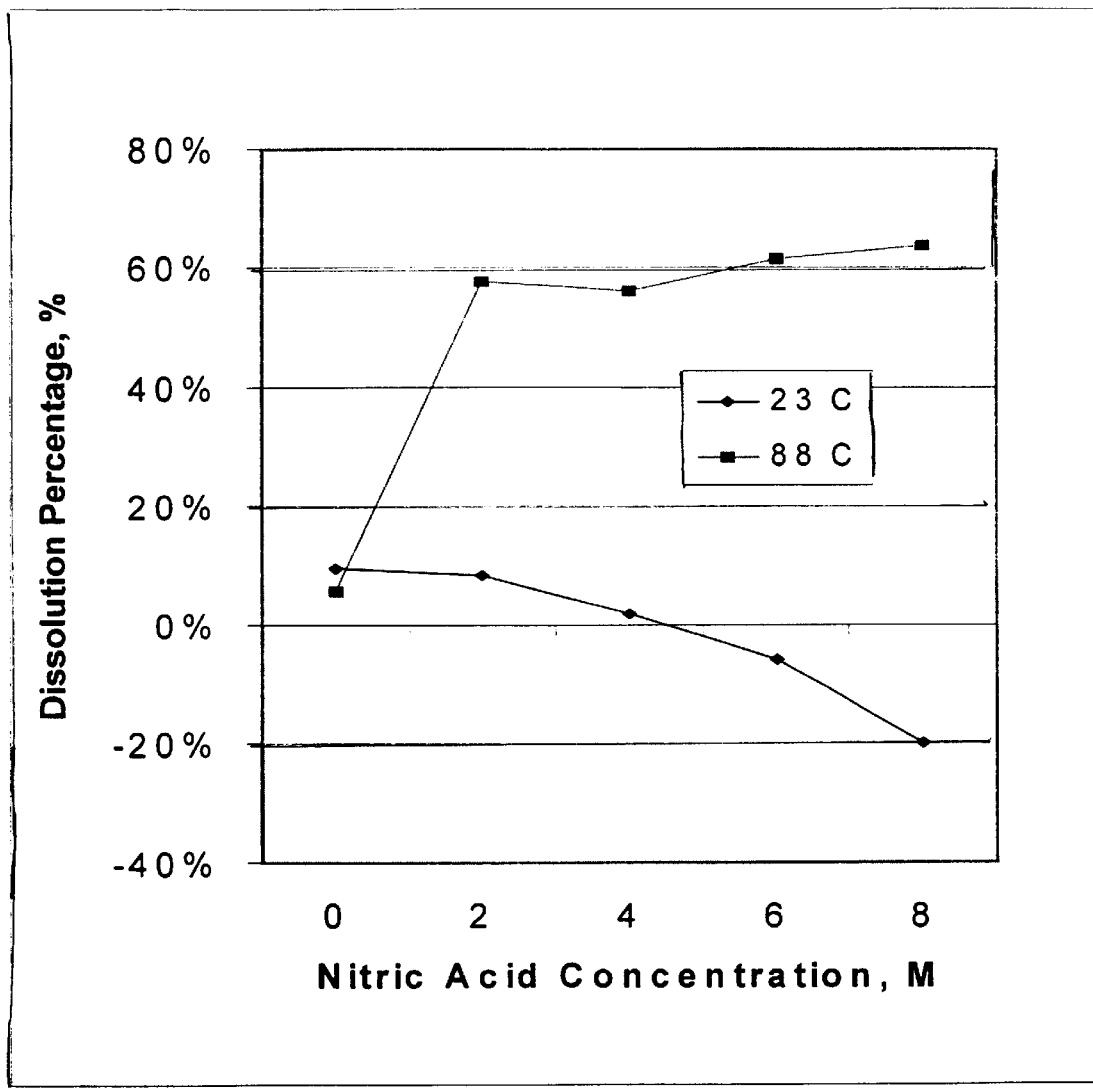
FIG. 3 shows solubility of aluminum calcine in various concentrations of nitric acid at 23° C. (♦) and 88° C. (■).

Since nitric acid was the most effective dissolution reagent from the screening tests of Example 1, more tests were performed to study the effect of nitric acid concentration. The dissolution percentages of aluminum calcine in various nitric acid concentrations are shown in Table 3 and FIG. 3. At the elevated temperature, the solubility of aluminum calcine jumped from 5.8% in water to 57.6% in 2 M nitric acid. The solubility leveled off, however, at higher nitric acid concentrations. When the concentration of nitric acid increased from 2 M to 8 M, the solubility only slightly increased from 57.6% to 63.7%. At room temperature, the solubility of aluminum calcine was very low and decreased as the concentration of nitric acid increased. This phenomenon indicated that more precipitates might form at higher nitric acid concentrations. Hence, aluminum calcine does not dissolve in nitric acid without heating, increase of nitric acid concentration above 2 M does not significantly increase the calcine dissolution, and nitric acid does not dissolve the calcine completely under the conditions tested.

TABLE 3

| Nitric Acid Concentration (M) | Solubilities of Aluminum Calcine (wt %) | |
|---|---|---|
| | 23° C. | 88° C. |
| 0 | 9.56 | 5.82 |
| 2 | 8.39 | 57.56 |
| 4 | 1.79 | 56.17 |
| 6 | −5.82 | 61.55 |
| 8 | −19.88 | 63.66 |

Figure 4:
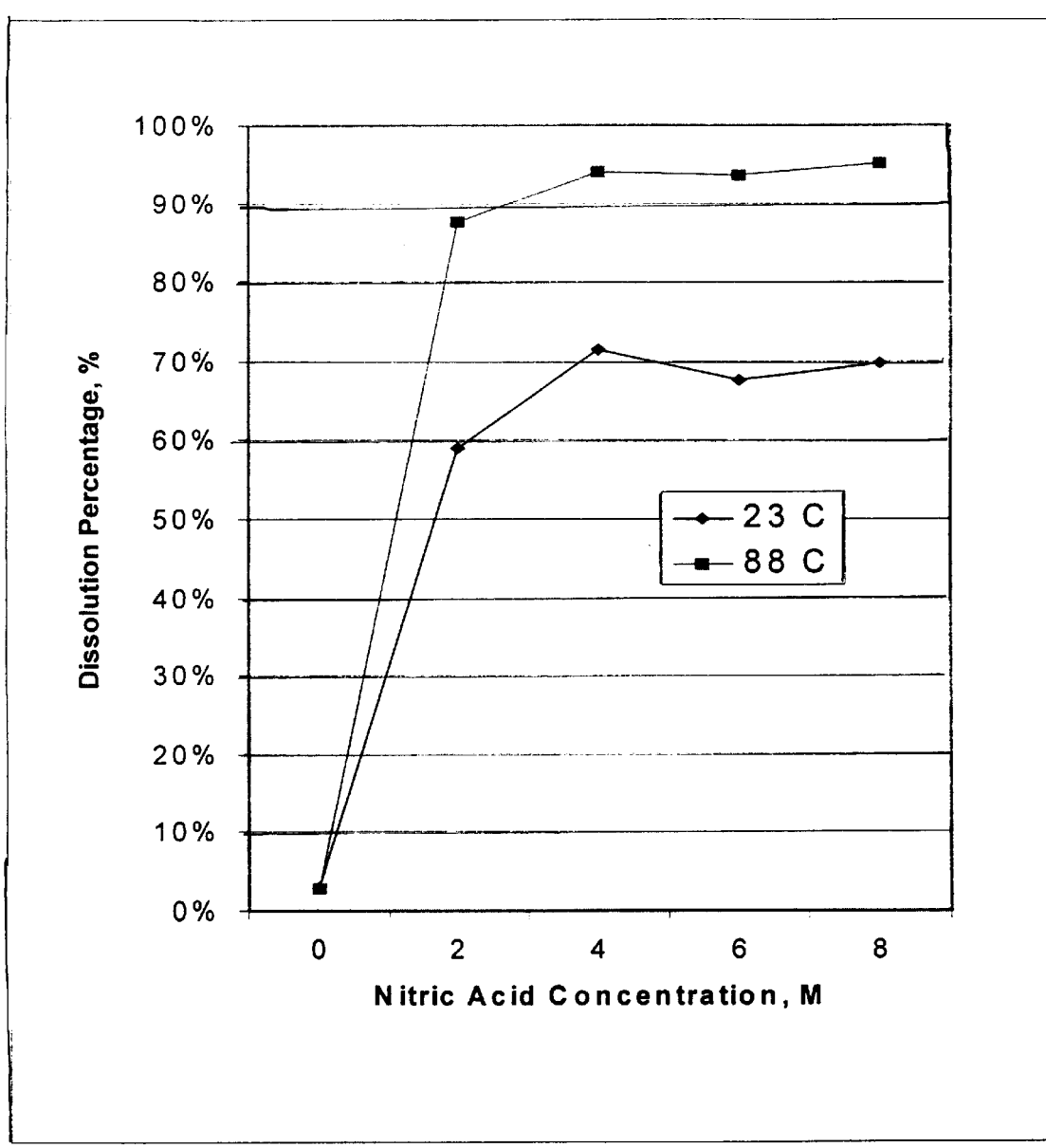
FIG. 4 shows solubility of zirconium calcine in various concentrations of nitric acid at 23° C. (♦) and 88° C. (■).

The dissolution percentages of zirconium calcine in various nitric acid concentrations are shown in Table 4 and FIG. 4. At the elevated temperature, the solubility of zirconium calcine jumped from 2.7% in water to 93.9% in 4 M nitric acid. The solubility leveled off, however, at higher nitric acid concentrations. When the concentration of nitric acid increased from 4 M to 8 M, the solubility only slightly increased from 93.9% to 95.2%. At room temperature, the solubility of zirconium calcine jumped from 2.9% in water to 71.5% in 4 M nitric acid. As also shown with elevated temperature, the solubility leveled off at higher nitric acid concentrations. When the concentration of nitric acid increased from 4 M to 8 M, the solubility slightly dropped from 71.5% to 69.7%. Therefore, zirconium calcine dissolves in nitric acid at elevated temperature, increase of nitric acid concentration above 4 M does not significantly increase the calcine solubility, and zirconium calcine is more soluble than aluminum calcine in nitric acid at room temperature.

TABLE 4

| Nitric Acid Concentration (M) | Solubilities of Zirconium Calcine (wt %) | |
|---|---|---|
| | 23° C. | 88° C. |
| 0 | 2.90 | 2.70 |
| 2 | 58.97 | 87.60 |
| 4 | 71.47 | 93.89 |
| 6 | 67.55 | 93.62 |
| 8 | 69.67 | 95.15 |

To quantitatively study the effect of nitric acid concentration, the term specific solubility was defined as the percent solubility divided by the molar concentration of nitric acid. The specific solubilities of aluminum calcine and zirconium calcine at elevated temperature are shown in Table 5. When the nitric acid concentration increased, the specific solubilities of both aluminum and zirconium calcines decreased steadily, indicating that the most effective nitric acid concentration was 2 M for both calcines. Above 2 M, the dissolved calcine decreases per mole of nitric acid.

TABLE 5

| Nitric Acid Concentration (M) | Solubilities of Aluminum and Zirconium Calcine in Nitric Acid (wt % per mole) at 88° C. | |
|---|---|---|
| | Al Calcine | Zr Calcine |
| 2 | 28.78 | 43.80 |
| 4 | 14.04 | 23.47 |
| 6 | 10.26 | 15.60 |
| 8 | 7.96 | 11.89 |

EXAMPLE 3

Since both nitric acid and oxalic acid can moderately dissolve aluminum calcine, a test was conducted to determine whether there was any synergistic effect of mixing these two solvents. Table 6 shows the results obtained with 2 M nitric acid, 1 M oxalic acid, and a mixture of 2 M nitric acid and 1 M oxalic acid. The averages of the solubilities in 2 M nitric acid and 1 M oxalic acid are provided for comparison. At room temperature, the solubility of aluminum calcine in the mixture of nitric acid and oxalic acid was 10.28%, which was lower than the average solubility of the two acids individually, 13.01%. At elevated temperature, the solubility of aluminum calcine in the mixture was 62.50%, which was only slightly higher than the average solubility of the two acids individually, 58.01%. Therefore, no synergistic effect of a mixture of nitric acid and oxalic acid was observed.

TABLE 6

| Treatment | Solubility of Aluminum Calcine (wt %) | |
| --- | --- | --- |
| | 23° C. | 88° C. |
| 2 M Nitric acid | 8.39 | 57.56 |
| 1 M Oxalic acid | 17.63 | 58.46 |
| 2 M Nitric acid + 1 M Oxalic acid | 10.28 | 62.50 |
| Average of 2 M Nitric acid and 1 M Oxalic acid | 13.01 | 58.01 |

EXAMPLE 4

Since both aluminum calcine and zirconium calcine are slightly soluble in water at room temperature (Example 1), a filtrate-recycle experiment was conducted to study the change of calcine solubilities as the filtrate is recycled. A fresh calcine sample was first dissolved in fresh water and its solubility was measured according to the procedure of Example 1. Another fresh calcine sample was then dissolved in the resulting filtrate. This procedure was repeated five times, and the results thereof are shown in Table 7. Zirconium calcine did not dissolve in the filtrate after the first two cycles. The solubility of aluminum calcine steadily decreased with each cycle, dropping from 10.11% to 6.80% after 4 cycles. Both aluminum calcine and zirconium calcine showed low solubilities in water at room temperature, and the solubilities of aluminum calcine and zirconium calcine decreased as the filtrate was recycled. These results show that water is acceptable for use as a liquid medium in physical separation steps.

TABLE 7

| Number of Recycles | Calcine Solubility (wt %) | |
| --- | --- | --- |
| | Al Calcine | Zr Calcine |
| 0 | 10.11 | 3.87 |
| 1 | 8.31 | 1.39 |
| 2 | 8.02 | 0.55 |
| 3 | 7.91 | −1.25 |
| 4 | 6.80 | −0.69 |

EXAMPLE 5

Determination of calcine particle size is needed to select specific physical separation methods for the pulp process method of the present invention. The size distributions of the two calcine samples of Example 1 were measured with an LS Particle Size Analyzer. A comparison of some key size fractions for aluminum calcine and zirconium calcine is shown in Table 8.

TABLE 8

| Size Fractions | Aluminum Calcine | Zirconium Calcine |
| --- | --- | --- |
| $d_{10}$ | 2.674 μm | 3.166 μm |
| $d_{25}$ | 6.316 μm | 7.097 μm |
| $d_{50}$ | 14.66 μm | 14.17 μm |
| $d_{75}$ | 34.93 μm | 24.43 μm |
| $d_{90}$ | 66.36 μm | 39.99 μm |
| −200 mesh | 92% | 97% |
| −400 mesh | 77% | 89% |

The $d_{50}$ (50% of the particles are less than this size) for aluminum calcine (14.66 μm) was about the same as for zirconium calcine (14.17 μm). However, the $d_{90}$ (90% of the particles are less than this size) of aluminum calcine and zirconium calcine were 66.36 μm and 39.99 μm, respectively. Materials of this size range would be expected to be a challenge to separate physically. However, this is not thought to be a problem since the size of the particles trapped in the HEPA filters are expected to be coarser due to agglomeration. Therefore, separation by physical methods, such as screening, flotation, shaking table, and fine-particle hydrocyclone are feasible.

EXAMPLE 6

Non-radioactive aluminum calcine (lot #RSA-1) and zirconium calcine (lot #R-74) were used in this experiment. The dissolution reagent, nitric acid, was of technical grade. Two sets of apparatuses were used. The apparatus used for the pulp processing tests comprised a 500-ml 3-neck flask placed on a heating mantle. The central neck contained an overhead stirrer shaft, the second neck held the probe of an electronic thermometer, and the third neck held a condenser. Six grams of fresh filter medium was shredded with a common paper shredder and blended with 3 g of calcine particles in the flask with 250 ml of 2 N nitric acid at a specified temperature for a specified period of time. Then, the calcine particles were separated from the filter medium and dried in an oven at 60° C. overnight. The calcine residue was weighed, and the calcine dissolution percentage was calculated from the weights of calcine feed and residue. (Refer to Example 1).

The second test apparatus was for simulating the filter leaching process, termed the "sandwich" process. The sandwich test apparatus was a specially designed reaction vessel comprising a stainless steel cylinder with an inside diameter of 2.75 inches (7 cm) and a total height of 7 inches (17.8 cm). A 16-mesh screen was welded inside the cylinder at a position 1.5 inches (3.8 cm) from the bottom. A 0.125 inch (0.3 cm) air-purge pipe was located 0.5 inch (1.3 cm) from the bottom, where air was introduced at a flow rate of 228 ml/second. Filter medium core samples were taken from a HEPA filter with a hole saw. The cores were 2.75 inches (7 cm) in diameter and 2.5 inches (6.4 cm) in height. The filter medium core was inserted in the reaction vessel. A movable screen was then placed on tope of the filter medium core. Both the bottom and the top of the reaction vessel were closed with plastic lids. On the top lid were two openings, a large one in the center to accept a condenser, and a small one near the side for a thermometer probe. The reaction vessel was placed in a water bath with constant temperature control. During the test, one filter medium core with 6 g of calcine particles was placed inside the reaction vessel, which had been filled with 400-ml of 2 N nitric acid at a specified temperature. After reaction at the specified temperature for a specified period of time, the calcine residue was separated from the filter medium and dried in an oven at 60° C. overnight. The calcine residue was then weighed, and the dissolution percentage was calculated from the weights of calcine feed and residue. (Refer to Example 1).

Reproducibility.

Four tests were first performed under exactly the same conditions (nitric acid concentration=2 N, temperature=88° C., and reaction time==0.5 hour) to assess the reproducibility of the experimental system. The results of these tests are shown in Table 9, wherein SD represents the standard deviation, and RSD represents the relative standard deviation.

TABLE 9

| | Percent Calcine Dissolution | |
|---|---|---|
| Test No. | Aluminum Calcine | Zirconium Calcine |
| 1 | 76.2 | 97.1 |
| 2 | 82.1 | 98.3 |
| 3 | 77.5 | 98.0 |
| 4 | 79.2 | 97.4 |
| Average | 78.6 | 97.8 |
| SD | 3.1 | 0.6 |
| RSD | 3.9 | 0.6 |

These results indicate that the reproducibility of the experimental system was very good. Under these conditions, the dissolution percentages of aluminum calcine and zirconium calcine were 78.6±3.1% and 97.8±0.6%, respectively.

Nitric Acid Addition Orders.

Two acid addition orders were designed. In "bulk addition" the nitric acid was added as one aliquot. In "incremental addition" the nitric acid was added in three aliquots. For the incremental addition, two sets of tests were performed (see Table 10). In both sets of tests, the total nitric acid additions were 2 N (1 N+0.75 N+0.25 N). The difference between the two sets is the reaction time. For set A, the total reaction time was 1 hour (0.5 hour+0.25 hour+0.25 hour). For set B, the total reaction time was 2 hours (1.0 hours+0.5 hour+0.5 hour).

TABLE 10

| Test | Nitric Acid Addition, N | | | Time Intervals, hour | | |
|---|---|---|---|---|---|---|
| Set | 1 | 2 | 3 | 1 | 2 | 3 |
| A (1 hour) | 1.0 | 0.75 | 0.25 | 0.5 | 0.25 | 0.25 |
| B (2 hour) | | | | 1.0 | 0.5 | 0.5 |

Figure 5:
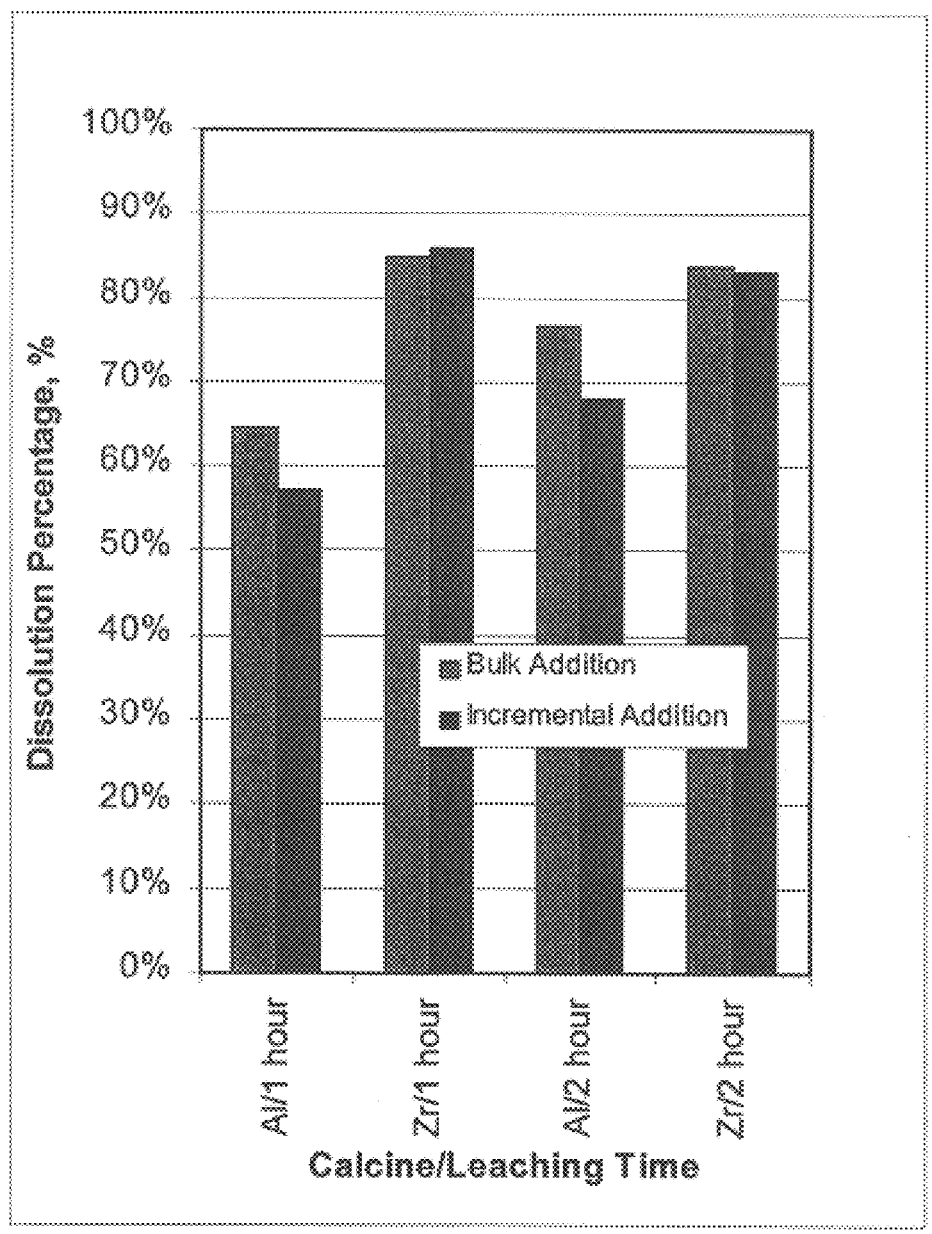
FIG. 5 shows a comparison of calcine dissolution percentages achieved by nitric acid bulk addition (shaded bars) and incremental addition (dark bars).

At 88° C., experiments of nitric acid addition order were conducted for both aluminum calcine and zirconium calcine. The results are shown in Table 11 and FIG. 5. It is apparent that for zirconium calcine, the dissolution percentages achieved by incremental addition and bulk addition were almost the same. For aluminum calcine, the dissolution percentages achieved by incremental addition were 8–9% lower than those achieved by bulk addition. It is apparent that incremental addition does not improve calcine dissolution.

TABLE 11

| | Percent Calcine Dissolution | |
|---|---|---|
| Treatment | Bulk | Incremental |
| Al/1 hour | 64.7 | 57.2 |
| Zr/1 hour | 84.9 | 85.9 |
| Al/2 hour | 76.8 | 67.9 |
| Zr/2 hour | 83.7 | 83.1 |

Reaction Temperature.

Figure 6:
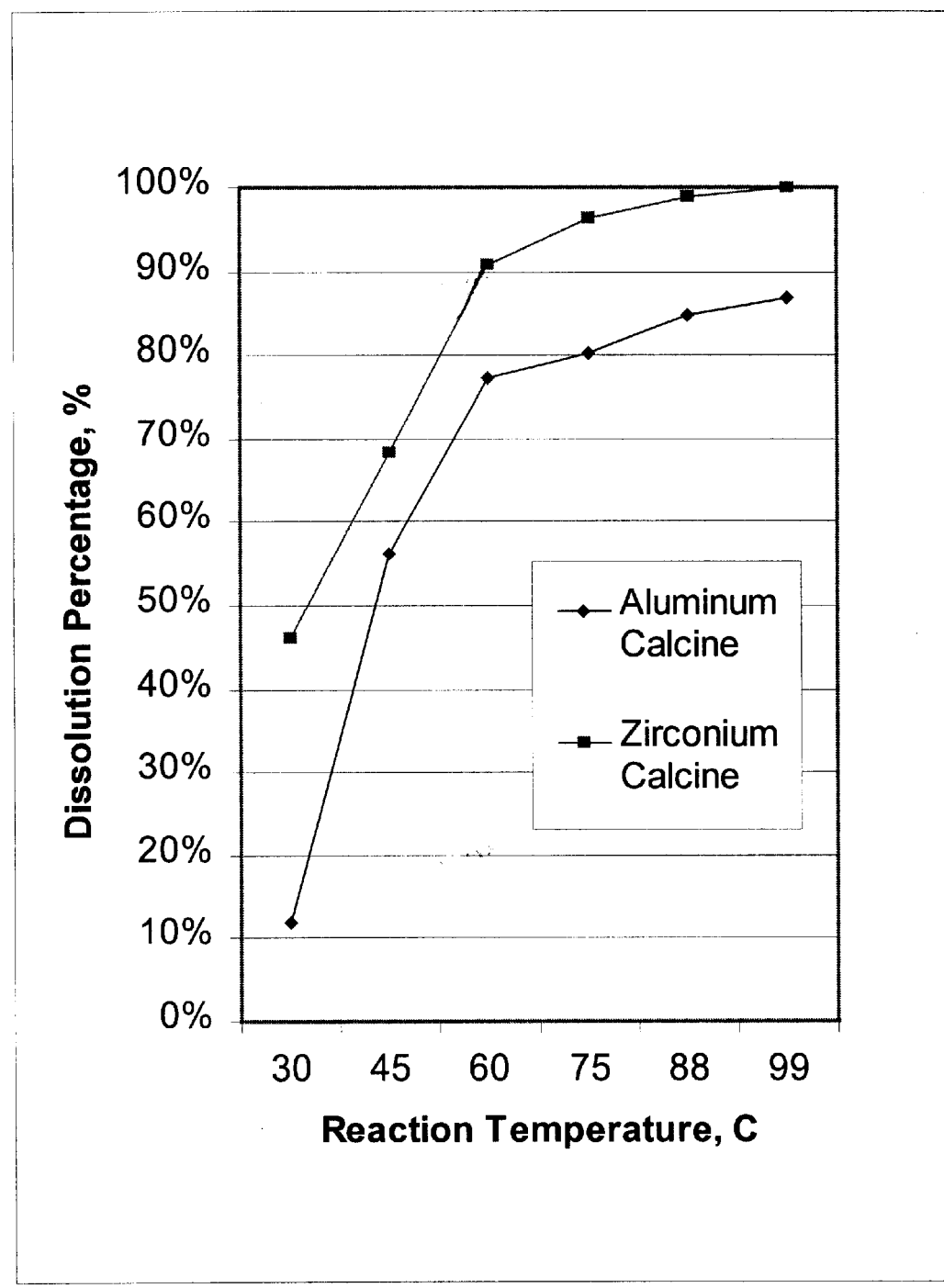
FIG. 6 shows dissolution of aluminum calcine (♦) and zirconium calcine (■) in 2 N nitric acid for 1 hour at various temperatures.

With a nitric acid concentration of 2 N and a reaction time of 1 hour, a series of experiments was conducted to study the effect of the reaction temperature. The temperatures used were 30° C. (room temperature), 45° C., 60° C., 75° C., 88° C., and 99° C. (boiling point). The results are shown in Table 12 and FIG. 6. It is apparent that heating is critical in achieving high calcine dissolution. Below 60° C., calcine dissolution percentages increased rapidly with temperature. When temperature rose from 30° C. to 600° C., the dissolution percentages rose from 12% to 77% for aluminum calcine and from 46% to 91% for zirconium calcine. Above 60° C., the dissolution percentages still increased with an increase of temperature, but much lower rates. When temperatures rose from 60° C. to 99° C., the dissolution percentages rose from 77% to 87% for aluminum calcine and from 91% to 100% for zirconium calcine. Therefore, calcine dissolution should be carried out at as high a temperature as possible.

TABLE 12

| | Dissolution of Calcine (wt %) | |
|---|---|---|
| Temperature (° C.) | Aluminum Calcine | Zirconium Calcine |
| 30 | 11.9 | 46.2 |
| 45 | 56.1 | 68.4 |
| 60 | 77.4 | 90.9 |
| 75 | 80.3 | 96.4 |
| 88 | 84.8 | 98.8 |
| 99 | 86.9 | 99.9 |

Comparison of Sandwich Process and Pulp Process.

Figure 7:
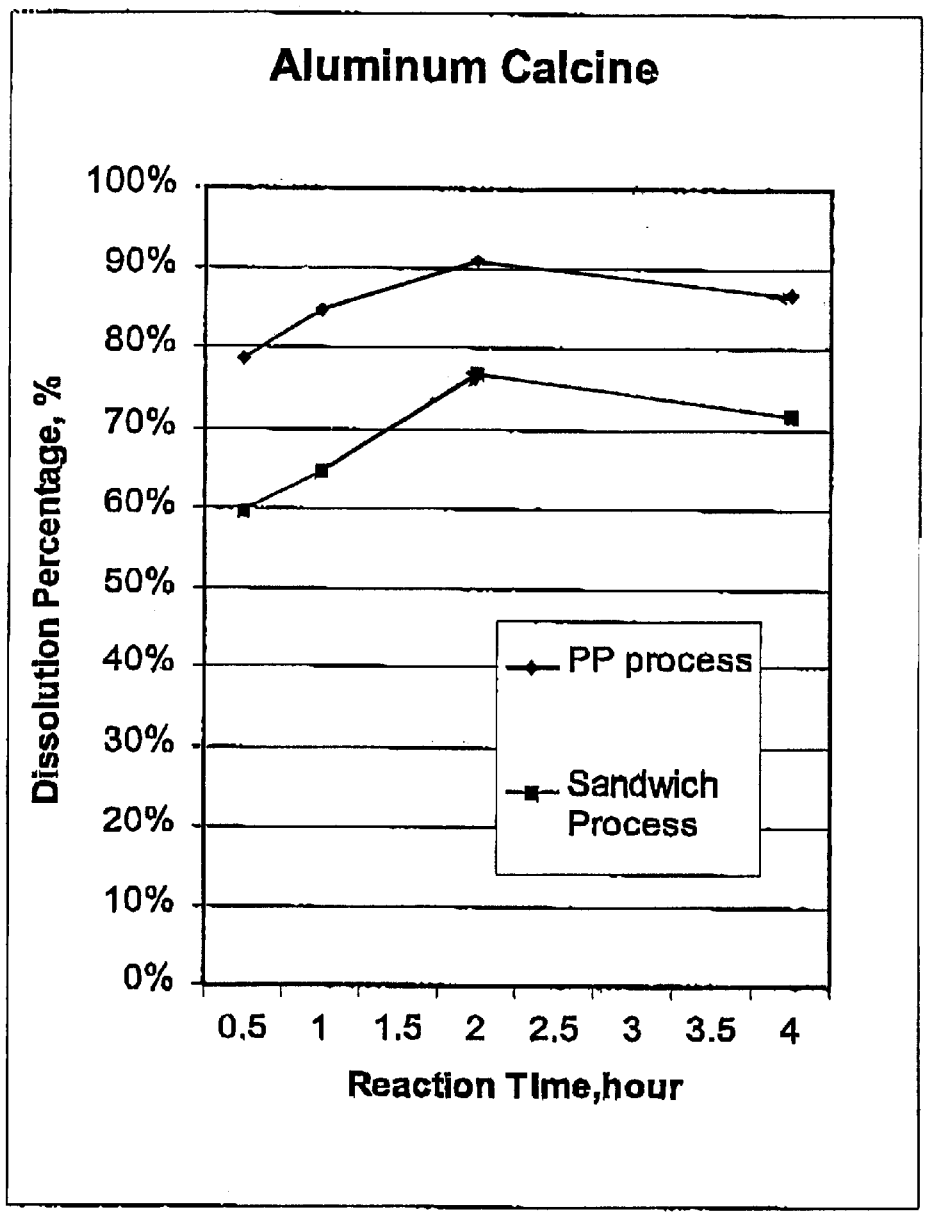
FIG. 7 shows dissolution of aluminum calcine in 2 N nitric acid at 880° C. for 0.5,1, 2 and 4 hours by the pulp process (♦) and sandwich (leaching) process (■).
Figure 8:
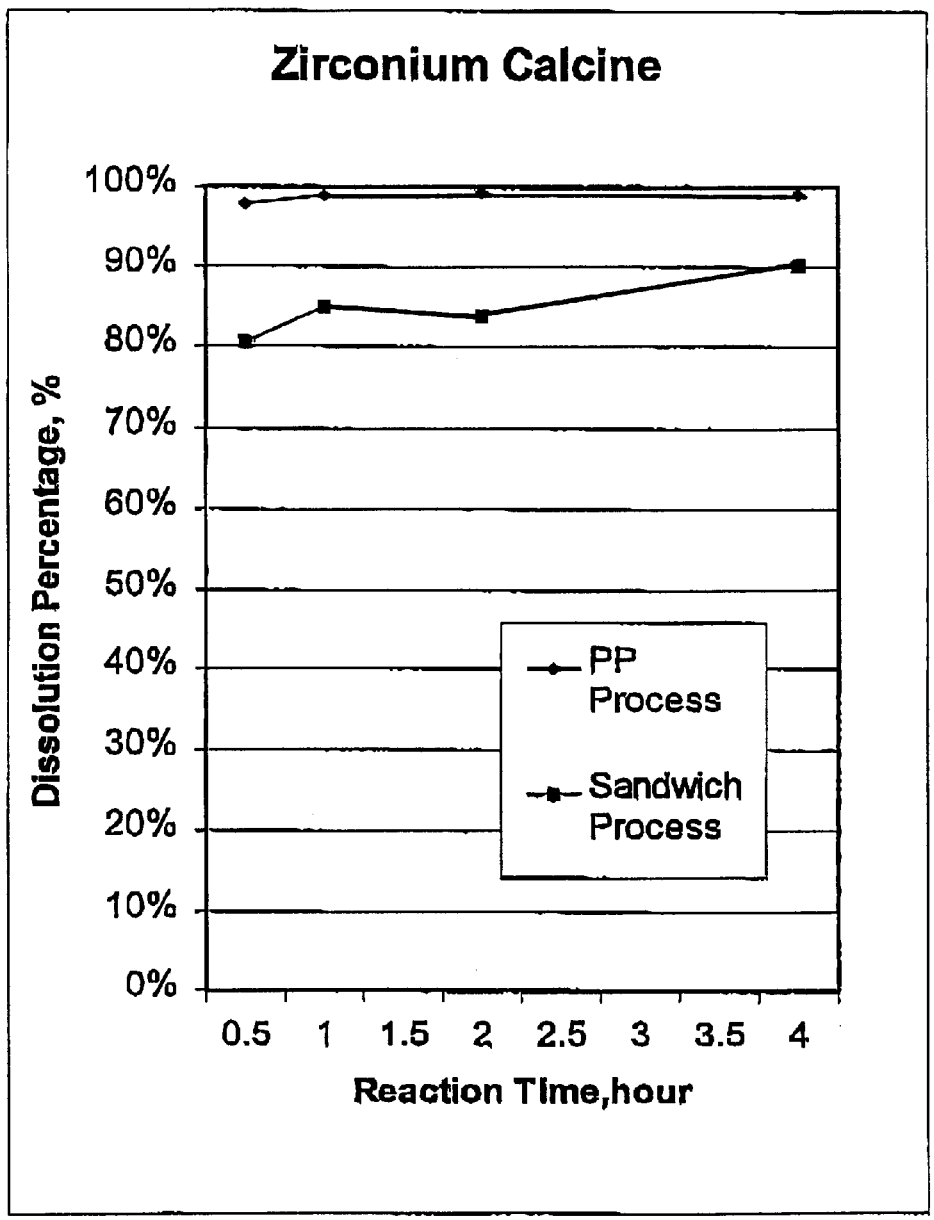
FIG. 8 shows dissolution of zirconium calcine in 2 N nitric acid at 880° C. for 0.5, 1, 2 and 4 hours by the pulp process (♦) and sandwich (leaching) process (■)

The sandwich process and pulp process were compared in tests performed at four different reaction times: 0.5 hr, 1.0 hr, 2.0 hr, and 4.0 hr. The results obtained with aluminum calcine are shown in Table 13 and FIG. 7, and the results obtained with zirconium calcine are shown in Table 14 and FIG. 8.

TABLE 13

| Reaction Time | Dissolution of Aluminum Calcine (wt %) | |
|---|---|---|
| (hours) | Pulp | Sandwich |
| 0.5 | 78.6 | 59.7 |
| 1.0 | 84.8 | 64.7 |
| 2.0 | 91.0 | 76.8 |
| 4.0 | 86.8 | 71.7 |

TABLE 14

| Reaction Time | Dissolution of Zirconium Calcine (wt %) | |
|---|---|---|
| (hours) | Pulp | Sandwich |
| 0.5 | 97.8 | 80.5 |
| 1.0 | 98.8 | 84.9 |
| 2.0 | 99.3 | 83.7 |
| 4.0 | 99.0 | 90.1 |

It is apparent that under the same conditions, calcine dissolution percentages achieved using the pulp process of the present invention are significantly higher than those achieved in the sandwich process. With a reaction time of 0.5 hour, the pulp process raised the dissolution percentages by 19% and 17% for aluminum calcine and zirconium calcine, respectively. These results demonstrate the advantages of the pulp process of the present invention over the leaching process.

We claim:

1. A method for reducing contamination with radioactive and hazardous materials of a HEPA filter comprising a filter medium and housing in which the filter medium is contained comprising:

removing loose particles and solids from the HEPA filter;

removing the filter medium from the housing;

decontaminating the housing; and after removing the filter medium from the housing, processing the filter medium in a liquid medium for removing trapped particles;

disposing of the filter medium from which the particles have been removed as non-hazardous waste;

collecting the particles from the liquid medium, stabilizing the collected particles, and disposing of the stabilized particles; and recycling the liquid medium after the particles are collected therefrom repelling the loose particles and solids and collecting them in a collection vessel.

2. The method of claim 1 wherein said removing loose particles and solids from the HEPA filter comprises electrostatically charging the housing and filter medium for repelling the loose particles and solids and collecting them in a collection vessel.

3. The method of claim 1 wherein said removing loose particles and solids from the HEPA filter comprises dipping the HEPA filter in water or other liquid medium such that the loose particles and solids are released into the water or other liquid medium.

4. The method of claim 3 further comprising using a vibrator or ultrasonic source for shaking the loose particles and solids off of the HEPA filter and into the water or other liquid medium.

5. The method of claim 3 further comprising collecting the loose particles and solids from the water or other liquid medium and disposing of such collected loose particles and solids.

6. The method of claim 4 further comprising collecting the loose particles and solids from the water or other liquid medium and disposing of such collected loose particles and solids.

7. The method of claim 1 wherein said removing the filter medium from the housing comprises cutting.

8. The method of claim 1 wherein said decontaminating the housing comprises a member selected from the group consisting of washing, wiping, scraping, and combinations thereof.

9. The method of claim 1 wherein said processing the filter medium in a liquid medium comprises agitating and mixing the filter medium in the liquid medium.

10. The method of claim 9 wherein said agitating and mixing comprises fluid jetting, mixing, or stream or air sparging, or combinations thereof.

11. The method of claim 9 further comprising separating the filter medium from the liquid medium.

12. The method of claim 11 further comprising dewatering the filter medium separated from the liquid medium.

13. The method of claim 1 wherein said collecting the particles from the liquid medium comprises filtration.

14. The method of claim 1 wherein said collecting the particles from the liquid medium comprises use of a member selected from the group consisting of hydro-cyclone, floatation, shaking table, and heavy media separation.

15. The method of claim 1 wherein said processing the filter medium in a liquid medium comprises dissolving the particles and solids into the liquid medium.

16. The method of claim 15 wherein said liquid medium comprises a nitric acid solution.

17. The method of claim 1 wherein said removing the filter medium from the housing comprises chipping.

18. The method of claim 1 wherein said removing the filter medium from the housing comprises scraping.

19. The method of claim 1 wherein said removing the filter medium from the housing comprises shredding.

20. The method of claim 1 wherein said removing the filter medium from the housing comprises combinations of cutting, chipping, scraping, and shredding.

* * * * *